(12) United States Patent
Wanger

(10) Patent No.: US 7,008,108 B2
(45) Date of Patent: Mar. 7, 2006

(54) GAS BEARING FOR A RAPIDLY ROTATING SHAFT, COMPRISING AN ADJUSTING DEVICE FOR ECCENTRICALLY ADJUSTING A GAS BEARING AND A METHOD FOR OPERATING A GAS BEARING OF THIS TYPE

(76) Inventor: Gerhard Wanger, Grosslellenfeld 364, 91722 Arberg (DE)

( * ) Notice: Subject to any disclaimer, the term of this patent is extended or adjusted under 35 U.S.C. 154(b) by 22 days.

(21) Appl. No.: 10/416,407

(22) PCT Filed: Nov. 6, 2001

(86) PCT No.: PCT/DE01/04130

§ 371 (c)(1),
(2), (4) Date: Oct. 17, 2003

(87) PCT Pub. No.: WO02/38974

PCT Pub. Date: May 16, 2002

(65) Prior Publication Data

US 2004/0069617 A1 Apr. 15, 2004

(30) Foreign Application Priority Data

Nov. 10, 2000 (DE) .................................. 100 55 787

(51) Int. Cl.
*F16C 32/06* (2006.01)
(52) U.S. Cl. .................. 384/100; 29/898.02; 384/114; 384/255

(58) Field of Classification Search ................ 384/100, 384/107, 114, 247, 255; 29/898.02
See application file for complete search history.

(56) References Cited

U.S. PATENT DOCUMENTS

| 4,643,592 A | 2/1987 | Lewis et al. |
| 5,516,212 A | 5/1996 | Titcomb |
| 5,772,334 A | 6/1998 | Martin et al. |
| 5,947,606 A | 9/1999 | Wanger |

FOREIGN PATENT DOCUMENTS

JP 09 126228 5/1997

*Primary Examiner*—Thomas R. Hannon
(74) *Attorney, Agent, or Firm*—Collard & Roe, P.C.

(57) ABSTRACT

The invention relates to a gas bearing of a rapidly rotating shaft, whose end supports a tool, in particular to a gas bearing of a rapidly rotating shaft, whose end supports a polygon mirror (27) for a spindle of an optical application. To provide radial support along the shaft (3), gas bearings are arranged in a housing (5), whereby a first gas bearing (9) and a third gas bearing (8) are positioned concentrically in relation to one another and a second gas bearing (2), which is located midway between the first gas bearing (9) and the third gas bearing (8), is mounted in an eccentrically offset manner to the first gas bearing (9) and the third gas bearing (8). The invention is also provided with an adjusting device (1) for increasing the eccentric offset of the second gas bearing (2) as the rotational speed of the shaft (3) increases.

28 Claims, 3 Drawing Sheets

Figure 2:
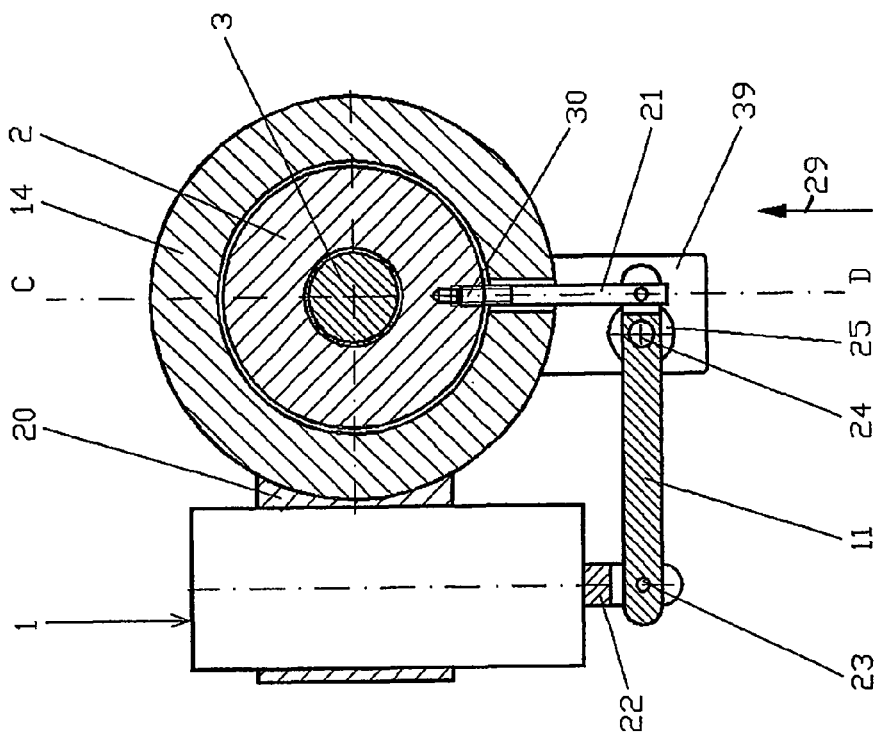

GAS BEARING FOR A RAPIDLY ROTATING SHAFT, COMPRISING AN ADJUSTING DEVICE FOR ECCENTRICALLY ADJUSTING A GAS BEARING AND A METHOD FOR OPERATING A GAS BEARING OF THIS TYPE

Applicant claims priority under 35 U.S.C. §119 of German Application No. 100 55 787.2 filed Nov. 10, 2000. Applicant also claims priority under 35 U.S.C. §365 of PCT/DE01/04130 filed Nov. 6, 2001. The international application under PCT article 21(2) was not published in English.

The invention relates to a gas mounting of a rapidly rotating shaft with a tool arranged at one end, having the features of the preamble of patent claim 1. The invention relates, furthermore, to a method for operating a gas mounting of a rapidly rotating shaft, having the features of the preamble of patent claim 25.

A gas mounting of a rapidly rotating tool is known as prior art from DE 197 25 784 C2, at least three gas bearings being present for the radial mounting of a shaft, and the bearing bores of the first and of the third gas bearing being arranged concentrically to one another, while the bearing bore of the second gas bearing is formed so as to be eccentrically offset to the bearing bores of the first and of the third gas bearing.

Furthermore, DE 198 21 601 C1 (an additional patent to DE 197 25 784 C2) describes a gas mounting of a rapidly rotating shaft, in which the value of the radial rigidity of the middle gas bearing with respect to the housing is to be selected so as to be as low as possible in relation to the value of the radial rigidity of the first or the third gas bearing with respect to the housing.

The object on which the invention is based is to offer a gas mounting of a rapidly rotating shaft with a tool arranged at one end, said gas mounting being adaptable individually to specific operating conditions. Furthermore, a method for operating a gas mounting of this type is to be offered.

For the gas mounting, this object is achieved by means of the features of the characterizing part of patent claim 1, in conjunction with the features of the preamble. Advantageous embodiments of the gas mounting are described in subclaims 2–24. For the method, the object is achieved by means of the features of the characterizing part of patent claim 25. Advantageous method variants are described in subclaims 26–29.

The gas mounting according to the invention possesses an adjusting device for the eccentric offset of a second gas bearing as a function of the rotational speed of the shaft. When the gas mounting of the rapidly rotating shaft is operated at very high rotational speeds of 120 000 revolutions/min. or above, the final rotational speed of the shaft is within the supercritical oscillation range. Consequently, when the shaft is being run up to the final rotational speed, it is necessary to pass through the first characteristic oscillation of the gas mounting, which, at the ever higher final rotational speeds demanded by the user, becomes increasingly more difficult, since the balancing quality of the shaft must satisfy evermore stringent requirements.

In the gas mounting according to the invention, then, a radial bracing force variable as a function of the rotational speed of the shaft during run-up and run-down is introduced into the second gas bearing via the adjusting device, the radial bracing force of the adjusting device rising, in particular, with an increasing rotational speed during the run-up. As a result, the mounted shaft is operated in the supercritical oscillation range not only when the final rotational speed is reached, but during the entire run-up range toward the final rotational speed. Consequently, it is no longer necessary to pass through a characteristic oscillation of the gas mounting, and it is possible for the balancing quality of the shaft to satisfy low requirements.

In the case of a variation in the bracing force of the adjusting device as a function of the rotational speed of the shaft, the radial bearing gap of the second gas bearing with respect to the shaft and therefore, too, the gap height of the second gas bearing with respect to the housing are also varied.

In order to achieve increased stability during the run-up of the shaft, it became clear that the radial play of the second gas bearing with respect to the housing should be at least as great as the radial bearing play of the second gas bearing with respect to the received shaft.

According to a further advantageous embodiment of the gas mounting, frictional heat is discharged to the air-cooled or water-cooled housing from the second gas bearing via the first or the third gas bearing.

In order to achieve sufficient adjustability of the second gas bearing over all operating states, its axial play should be greater by at least the factor 1.15 than the product of its longitudinal expansion coefficient $\alpha$, the bearing width B and the temperature difference $\Delta t$ between the second gas bearing and the housing at the operating rotational speed.

The adjusting device according to the invention may generate the necessary radial bracing force electrically, electromagnetically, hydraulically or pneumatically, depending on the requirement profile.

To regulate the radial bracing force of the second gas bearing as a function of the rotational speed of the shaft, a rotational speed sensor is advantageously provided for detecting the shaft rotational speed. This rotational speed sensor may be designed, for example, as a Hall sensor or as an optical sensor.

In the case of an adjusting device designed electromagnetically, a lifting magnet or a brushless moving coil may be provided for generating the radial bracing force of the adjusting device, with the result that commercially available components can be used.

If necessary, force amplification, for example in the form of a lever and/or a gearwheel step-up, may be provided for force amplification and force metering between the second gas bearing and the adjusting device. The radial bracing force introduced into the second gas bearing can consequently be metered exactly.

Furthermore, improved stability of the shaft mounting during the run-up of the rotational speed is achieved when the ratio of the radial bracing force $F_V$ of the adjusting device to the radial rigidity c of the second gas bearing at the commencement of the half-frequency vortex is at most greater by the factor 3.3 than at the operating rotational speed of the gas mounting.

The vector of the radial frictional force $F_R$ between the plane surfaces of the first or the third gas bearing and of the second middle gas bearing is opposite to the direction of movement of the second gas bearing in the case of a variation in the radial bracing force of the latter. Consequently, during the run-up of the shaft to the final rotational speed, the radial frictional force counteracts the radial bracing force of the adjusting device, while, during the run-down of the shaft, the frictional force acts in the same direction as the bracing force, with the result that the second gas bearing is additionally loaded during the run-down of the shaft. In order to avoid an overloading of the second gas bearing, the radial frictional force of the second gas bearing should amount to at most 65% of the maximum radial bracing force $F_{V_{max}}$ of the adjusting device at the operating rotational speed.

An advantageous stabilization of the shaft, even in the initial phase, during the run-up to the final rotational speed is achieved when the adjusting device possesses, in the state of rest of the gas mounting, a minimum eccentricity of 10% of the radial bearing gap of the second gas bearing with respect to the shaft. In the case of an adjusting device which generates the radial bracing force electrically or electromagnetically, regulation can take place by means of an electrical signal (for example, a voltage) as a function of the rotational speed. Since the rapidly rotating shaft is mostly driven electrically, already existing components for establishing the rotational speed (for example, a Hall sensor) may be utilized additionally for detecting the rotational speed in order to determine the radial bracing force.

In the case of an adjusting device which generates the radial bracing force hydraulically or pneumatically, an electrically actuated regulating valve, which converts the electrical signal from the rotational speed sensor into a pressure signal, can be used additionally.

A further particularly advantageous embodiment of the adjusting device is obtained when the radial bracing force is generated pneumatically and a pressure chamber for generating the radial bracing force is provided, which is connected to a bearing gap of the shaft via a bore. This bore serves as a pressure compensation bore, with the result that the pressure built up in a radial or axial bearing gap of the shaft is transferred to the pressure chamber of the second gas bearing, as a consequence of which the desired radial bracing force is built up or reduced with its time profile as a function of the rotational speed on the second gas bearing. There is therefore no need for any additional assemblies, for example for the electrical or electromagnetic generation of the radial bracing force, the latter being formed automatically during the run-up of the shaft to the operating rotational speed.

The pressure chamber may be formed in the housing of the gas mounting and, in a particularly advantageous embodiment, is arranged between the second gas bearing of the housing, no further components being required. The pressure compensation bore and the pressure chamber are to assume as small a volume as possible, since the conveying capacity of the gas mounting is low, and therefore, in the event of a desired rapid pressure buildup during the run-up of the shaft to the final rotational speed, the pressure chamber should have as small a gap height as possible between the second gas bearing and the housing.

In the operating state, however, the gap height of the pressure chamber advantageously amounts to at least 70% of the radial play of the second gas bearing. The width of the pressure chamber is to amount to at least 40% of the bearing width of the second gas bearing, in order to apply the necessary radial bracing forces.

In order to achieve a reliable pressure buildup in the pressure chamber, sealing is to be provided, which is advantageously formed via sealing rings. These sealing rings may consist of silicone, so as to increase the radial rigidity of the second gas bearing as little as possible.

In the adjusting device, designed as described, for the selfregulating pneumatic generation of the radial bracing force, no electrical control/regulation is necessary in order to generate the radial bracing force, in contrast to adjusting devices according to the other principles outlined. Instead, selfregulating pneumatic generation of the radial bracing force takes place, which, with an appropriate selection of the pressure point at which the compensation bore issues into the pressure chamber, gives the desired increasing profile of the radial bracing force during the run-up to the final rotational speed.

In the case of a second gas bearing designed cylindrically, the pressure chamber is advantageously formed on a part region of the outer surface of the second gas bearing, the circumferential angle $\beta$ of the pressure chamber for generating the radial bracing force amounting to a maximum of about 210 degrees of angle. A particularly advantageous and controlled action of the radial bracing force occurs when the circumferential angle $\beta$ of the pressure chamber amounts to about 120 degrees of angle.

In the method according to the invention for operating a gas mounting of a rapidly rotating shaft with a tool arranged at one end, an increasing eccentric offset of the second gas bearing with an increasing rotational speed of the shaft is carried out via an adjusting device. According to an advantageous method variant, in this case the eccentric offset and consequently the radial bracing force of the adjusting device rise with an increasing rotational speed of the shaft at least linearly and, in particular, progressively. The radial bracing force of the adjusting device may in this case be generated electrically, electromagnetically, hydraulically or pneumatically.

A particularly advantageous method variant is implemented when the adjusting device is automatically actuated pneumatically, no external gas supply taking place, but, instead, a pressure buildup for generating the radial bracing force taking place via a bore between a bearing gap of the shaft and a pressure chamber.

Advantageously, in this case, the pressure in the radial or axial bearing gap at the orifice of the bore rises and falls with a decreasing rotational speed, with the result that the desired rising and falling profile of the radial bracing force during the run-up and the run-down of the shaft is established.

Figure 1:
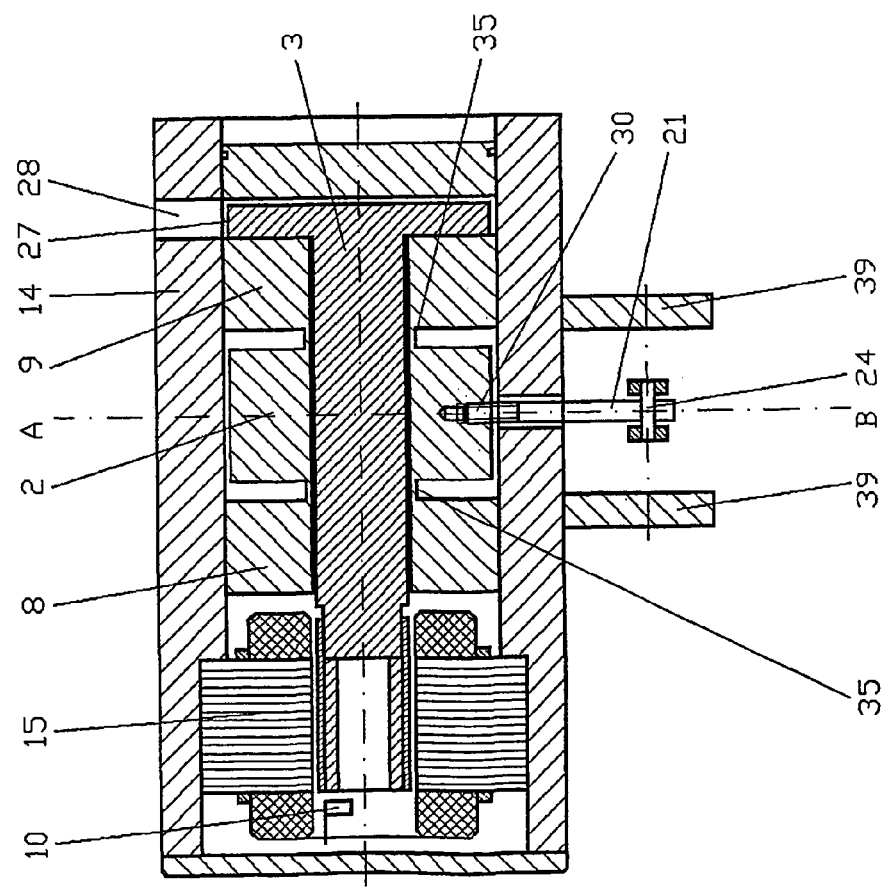
Figure 3:
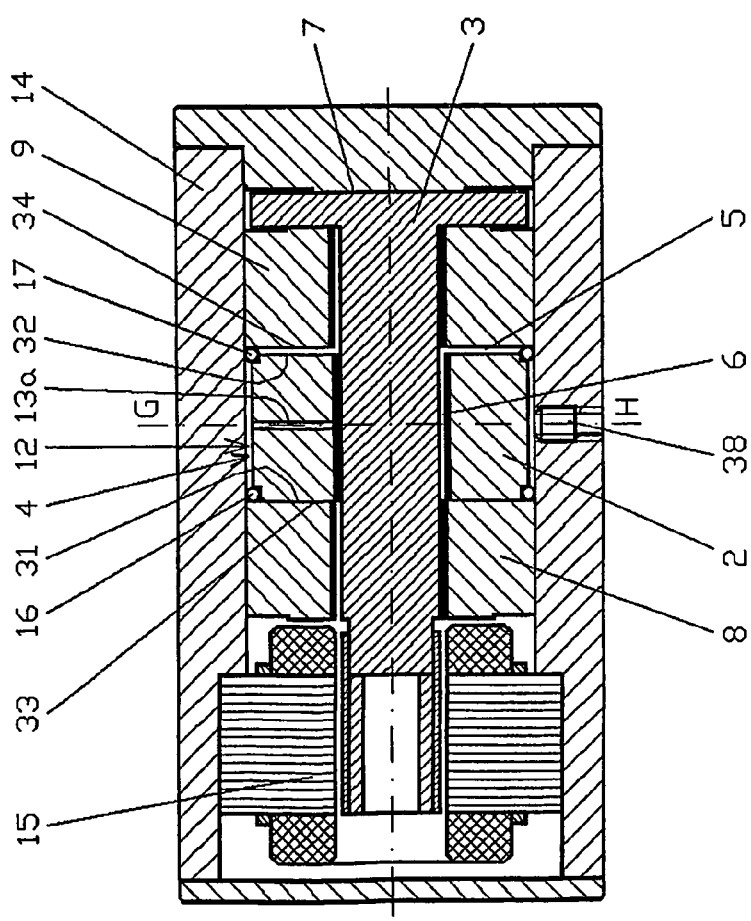
Figure 4:
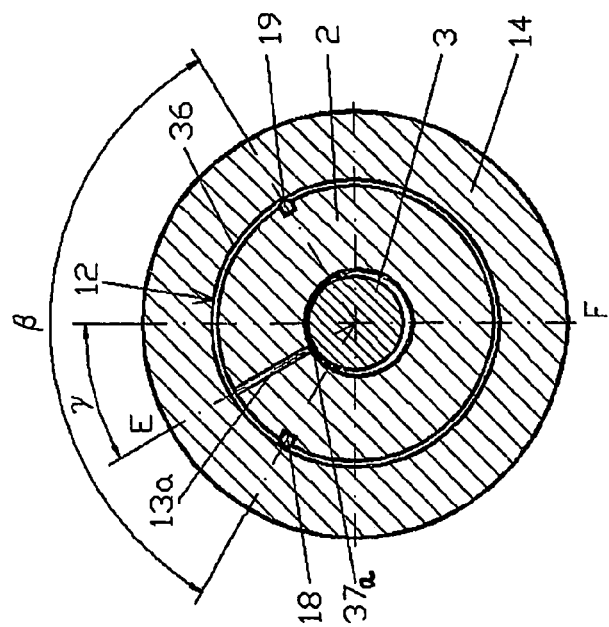
Figure 5:
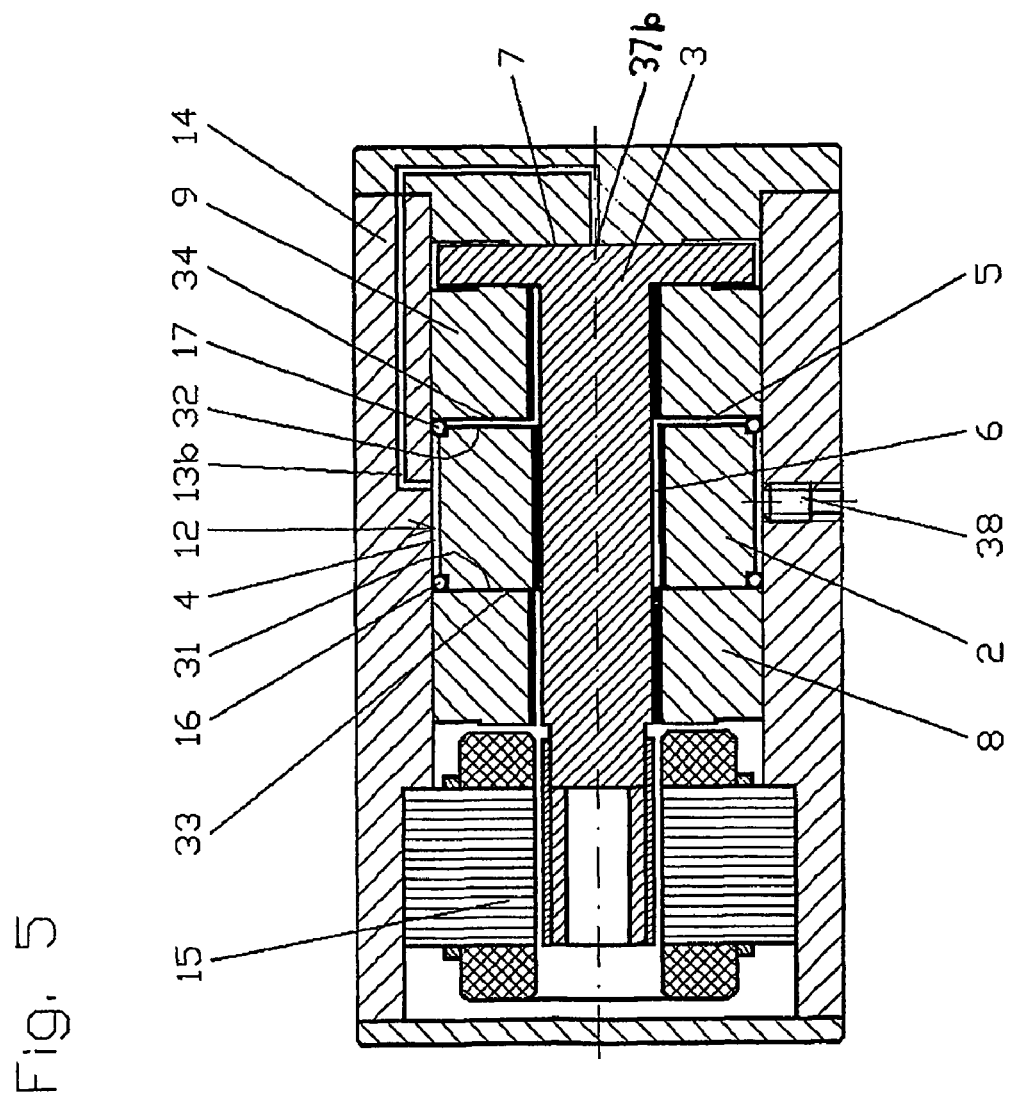

The invention is explained in more detail with reference to exemplary embodiments in the drawing figures of which:

FIG. 1 shows a longitudinal section C-D according to FIG. 2 through an essentially cylindrically designed housing of a first embodiment of a gas mounting, FIG. 2 shows a section A-B according to FIG. 1, FIG. 3 shows a section E-F according to FIG. 4 through an essentially cylindrical housing of a second embodiment of a gas mounting, FIG. 4 shows a section G-H according to FIG. 3, and FIG. 5 shows a longitudinal section through an essentially cylindrical housing of a further embodiment of a gas mounting.

FIG. 1 shows a first embodiment of a gas mounting of a rapidly rotating shaft 3 in an essentially cylindrically designed housing 14. The shaft 3 is driven by a motor 15, for example a direct-current motor or a three-phase asynchronous motor, the gas mounting consisting of a second middle gas bearing 2 and a first gas bearing 9 and a third gas bearing 8 which may be connected via webs 35.

At that end of the shaft 3 which faces away from the motor 15 may be located a polygonal mirror 27 which may be illuminated with light beams, for example laser beams, via an orifice 28 in the housing 14, in which case the reflected laser beams may be used for building up a digital image according to laser display technology (LDT). In this case, the shaft 3 is operated at an operating rotational speed of 120 000 revolutions/min. or higher. The application outlined for LDT use is only one of many possible applications. Any other tool may also be mounted at the end of the shaft 3.

In the case of the gas mounting according to FIG. 1, then, a, for example, electromagnetically operating adjusting device 1 is provided on a holding device 20 of the housing 14 according to FIG. 2, said adjusting device being connected to the second middle gas bearing 2 via a tie 22, a joint 23, the lever 11 and the further joint 24 on the bearing 25 of the holder 39 via the pull/push rod 21. When the adjusting device 1 is actuated, a radial bracing force $F_V$ is introduced to the second gas bearing 2 in the force direction 29 via the pull/push rod 21. The adjusting device 1 thus serves for the increasing eccentric offset of the second gas bearing 2 with respect to the first gas bearing 9 and to the third gas bearing 8 at an increasing rotational speed of the shaft 3 which is established, for example, via a rotational speed sensor 10, for example a Hall sensor. The rotational speed sensor 10 is connected via a control/regulating means, not illustrated, to the activation of the adjusting device 1, so that the latter can exert an increasing radial bracing force $F_V$ on the second gas bearing 2 in the event of the increasing rotational speed of the shaft 3 during the run-up of the shaft 3 to the operating rotational speed. The pull/push rod 21 is in this case connected to the second gas bearing 2 via the screw 30.

In an embodiment of the gas mounting according to the invention, as shown in FIGS. 1 and 2, an external adjusting device 1 is provided, which introduces a radial bracing force $F_V$ into the second gas bearing 2 for the eccentric offset of the latter with respect to the first gas bearing 9 and to the third gas bearing 8 as a function of the rotational speed of the shaft 3.

Particularly advantageous embodiments of the gas mounting according to the invention may be gathered from FIGS. 3–5, no separate adjusting device 1 being provided, but, instead, the radial bracing force $F_V$ to the eccentric offset of the second gas bearing 2 during the run-up and run-down of the shaft 3 being generated pneumatically by means of a pressure which is built up in a radial bearing gap 6 or an axial bearing gap 7 and which is supplied to the second gas bearing 2 via a bore 13a or 13b having a pressure chamber 12 in order to apply the radial bracing force $F_V$.

The second gas bearing 2 possesses plane surfaces 31, 32 which can contact plane surfaces 33, 34 of the third gas bearing 8 and of the first gas bearing 9 in order to discharge heat from the second gas bearing 2. The distance between the plane surfaces 31, 32 corresponds to the width B of the second gas bearing 2. In the embodiments of the gas mounting according to FIGS. 3 and 5, a fixing screw 38 may be provided, which, however, serves only for fixing the second gas bearing 2 during production by drilling and has no use in connection with the eccentric offset of the second gas bearing 2.

The second gas bearing 2 has a radial play 4 with respect to the housing 14 and an axial play 5, here with respect to the first gas bearing 9.

The gas mounting according to FIG. 3 possesses a bore 13a which, starting from a radial bearing gap 6 between the second gas bearing 2 and the shaft 3, makes a connection to the pressure chamber 12 between the second gas bearing 2 and the housing 5. During the run-up of the shaft 3, then, the pressure built up in the radial bearing gap 6 is transferred via the bore 13a to the pressure chamber 12, the desired increasing radial bracing force $F_V$ building up there for the purpose of the eccentric offset of the second gas bearing 2 with respect to the first gas bearing 9 and to the third gas bearing 8.

The angle of inclination γ which indicates the position of the bore 13a in relation to the perpendicular may be gathered from the sectional view G-H according to FIG. 4. The pressure chamber 12 possesses the gap height 36 and a circumferential angle β and is sealed off with respect to the housing 14 in the axial direction of the gas mounting by means of the seals 16, 17 and in the tangential direction of the second gas bearing 2 by means of the seals 18, 19. The seals 16, 17, 18, 19 in this case form a curved square. The bore 13a with the pressure point 37a issues into the pressure chamber 12.

In the embodiment of the gas mounting according to FIG. 5, instead of the radial bore 13a, an axial bore 13b with a pressure point 37b is provided, which makes a connection between the pressure chamber 12 and the axial bearing gap 7 of the shaft 3.

A separate adjusting device 1 is not required either in the embodiments with a radial bore 13a (cf. FIGS. 3, 4) or in the embodiment with an axial bore 13b. The pressure required for applying the radial bracing force, and which acts on the second gas bearing 2 in the same way as the adjusting device 1 according to FIGS. 1 and 2, is generated internally, without a separate gas supply, by means of pressure built up in the bearing gaps 6, 7. A gas mounting of this type, with integrated pneumatic adjustment and application of the radial bracing force $F_V$, is therefore particularly reliable and requires a small number of components.

Reference Symbols

1 Adjusting device
2 Second gas bearing
3 Shaft
4 Radial play
5 Axial play
6 Radial bearing gap
7 Axial bearing gap
8 Third gas bearing
9 First gas bearing
10 Rotational speed sensor
11 Lever
12 Pressure chamber
13a,13b Bore
14 Housing
15 Motor
16,17,18,19 Seal
20 Holding device
21 Pull/push rod
22 Tie
23,24 Joint
25 Bearing
27 Polygonal mirror
28 Orifice
29 Force direction
30 Screw
31,32,33,34 Plane surface
35 Web
36 Gap height
37a,37b Pressure point
38 Fixing screw
39 Holder
$F_V$ Radial bracing force
$F_R$ Radial frictional force
c Radial rigidity
α Bearing expansion coefficient
β Circumferential angle
γ Angle of inclination
Δt Temperature difference

What is claimed is:

1. A gas mounting of a rapidly rotating shaft with a tool arranged at one end,
   gas bearings arranged in a housing being present for radial mounting along the shaft, and
   a first gas bearing and a third gas bearing being mounted concentrically to one another and a second gas bearing, which is located in the middle between the first gas bearing and the third gas bearing, being mounted so as to be eccentrically offset to the first and the third gas bearing,
   wherein an adjusting device (1) for the increasing eccentric offset of the second gas bearing (2) at an increasing rotational speed of the shaft (3) is provided; and
   wherein the second gas bearing (2) possesses an axial play (7).

2. The gas mounting as claimed in claim 1,
   wherein the radial play (4) of the second gas bearing (2) with respect to the housing (14) is at least as great as the radial bearing gap of the second gas bearing (2) with respect to the received shaft (3).

3. The gas mounting as claimed in claim 1,
   wherein the adjusting device (1) is designed for the electrical, electromagnetic, hydraulic or pneumatic generation of a radial bracing force $F_V$.

4. The gas mounting as claimed in claim 1,
   wherein at least one rotational speed sensor (10) is provided.

5. The gas mounting as claimed in claim 4,
   wherein the rotational speed sensor (10) is designed as a Hall sensor or as an optical sensor.

6. The gas mounting as claimed in claim 1,
   wherein force amplification is provided between the second gas bearing (2) and the adjusting device (1).

7. The gas mounting as claimed in claim 6,
   wherein the force amplification has a lever (11).

8. The gas mounting as claimed in claim 1,
   wherein the ratio of the radial bracing force $F_V$ of the adjusting device (1) to the radial rigidity c of the second gas bearing (2) at the commencement of the half-frequency vortex is at most greater by the factor 3.3 than at the operating rotational speed of the gas mounting.

9. The gas mounting as claimed in claim 1,
   wherein axial play (5) of the second gas bearing (2) is greater by at least the factor 1.15 than the product of its longitudinal expansion coefficient α, the bearing width B and the temperature difference Δt between the second gas bearing (2) and the housing (5) at the operating rotational speed.

10. The gas mounting as claimed in claim 1,
    wherein the radial frictional force $F_R$ of the second gas bearing (2) amounts to at most 65% of the maximum radial bracing force $F_{Vmax}$ of the adjusting device (1) at the operating rotational speed.

11. The gas mounting as claimed in claim 1,
    wherein the eccentric offset of the second gas bearing (2) possesses, in the state of rest of the gas mounting, a minimum eccentricity of 10% of the radial bearing gap (6) of the second gas bearing (2).

12. A gas mounting of a rapidly rotating shaft with a tool arranged at one end,
    gas bearings arranged in a housing being present for radial mounting along the shaft, and a first gas bearing and a third gas bearing being mounted concentrically to one another and a second gas bearing, which is located in the middle between the first gas bearing and the third gas bearing, being mounted so as to be eccentrically offset to the first and the third gas bearing,
    wherein an adjusting device (1) for the increasing eccentric offset of the second gas bearing (2) at an increasing rotational speed of the shaft (3) is provided; and
    wherein one of two plane surfaces (31, 32) of the second gas bearing (2) contacts a plane surface (33, 34) of the first gas bearing (9) or the third gas bearing (8).

13. A gas mounting of a rapidly rotating shaft with a tool arranged at one end,
    gas bearings arranged in a housing being present for radial mounting along the shaft, and
    a first gas bearing and a third gas bearing being mounted concentrically to one another and a second gas bearing, which is located in the middle between the first gas bearing and the third gas bearing, being mounted so as to be eccentrically offset to the first and the third gas bearing,
    wherein an adjusting device (1) for the increasing eccentric offset of the second gas bearing (2) at an increasing rotational speed of the shaft (3) is provided; and
    wherein a lifting magnet or a brushless moving coil is provided for generating the radial bracing force of the adjusting device (1).

14. A gas mounting of a rapidly rotating shaft with a tool arranged at one end,
    gas bearings arranged in a housing being present for radial mounting along the shaft, and
    a first gas bearing and a third gas bearing being mounted concentrically to one another and a second gas bearing, which is located in the middle between the first gas bearing and the third gas bearing, being mounted so as to be eccentrically offset to the first and the third gas bearing,
    wherein an adjusting device (1) for the increasing eccentric offset of the second gas bearing (2) at an increasing rotational speed of the shaft (3) is provided; and
    wherein the adjusting device (1) is designed for the pneumatic generation of a radial bracing force $F_V$, a pressure chamber (12), which is connected to a bearing gap (6, 7) via a bore (13), being provided for generating the radial bracing force $F_V$.

15. The gas mounting as claimed in claim 14,
    wherein the pressure chamber (12) is arranged between the second gas bearing (2) and the housing (5).

16. The gas mounting as claimed in claim 14,
    wherein the pressure chamber (12) has sealing against pressure loss.

17. The gas mounting as claimed in claim 16,
    wherein the sealing has at least one seal (16, 17).

18. The gas mounting as claimed in claim 17,
    wherein the seal (16, 17) consists of silicone.

19. The gas mounting as claimed in claim 14,
    wherein the circumferential angle β of the pressure chamber (12) amounts to about 120 degrees of angle.

20. The gas mounting as claimed in claim 14,
    wherein the angle β of the pressure chamber (12) amounts to at most about 210 degrees of angle.

21. The gas mounting as claimed in claim 14,
    wherein in the operating state, the gap height (18) of the pressure chamber (12) amounts to at least 70 percent of the radial play (4) of the second gas bearing (2).

22. The gas mounting as claimed in claim 14, wherein the diameter of the pressure chamber (12) is greater by at least the factor 1.7 than the diameter of the second gas bearing (2).

23. The gas mounting as claimed in claim 14,
wherein the width of the pressure chamber (12) amounts to at least 40 percent of the bearing width of the second gas bearing (2).

24. A method for operating a gas mounting of a rapidly rotating shaft with a tool arranged at one end, including a method for the gas mounting of a rapidly rotating shaft with a polygonal mirror arranged at one end for an optical spindle, three gas bearings arranged in a housing being present for radial mounting along the shaft, and a first and a third gas bearing being mounted concentrically to one another and a second gas bearing, which is located in the middle between the first and the third gas bearing, being mounted so as to be eccentrically offset to the first and the third gas bearing, wherein said method for operating a gas mounting of a rapidly rotating shaft comprising
providing an increasing eccentric offset of the second gas bearing with an increasing rotational speed of the shaft which takes place via an adjusting device.

25. The method for operating a gas mounting as claimed in claim 24,
wherein the radial bracing force of the adjusting device rises at least linearly with an increasing rotational speed of the shaft.

26. The method for operating a gas mounting as claimed in claim 24,
wherein the radial bracing force of the adjusting device is generated electrically, electromagnetically, hydraulically or pneumatically.

27. The method for operating a gas mounting as claimed in claim 24,
wherein the adjusting device is actuated pneumatically, a pressure feed of a pressure chamber, acting on the second gas bearing, of the adjusting device from a radial or axial bearing gap taking place via a bore.

28. The method for operating a gas mounting as claimed in claim 27,
wherein the pressure in the radial or axial bearing gap at the orifice to the bore rises with an increasing rotational speed of the shaft and falls with a decreasing rotational speed.

* * * * *